United States Patent
Chen (10) Patent No.: US 10,739,477 B2
(45) Date of Patent: Aug. 11, 2020

(54) OMNIDIRECTIONAL VECTOR GEOPHONE (71) Applicant: PetroChina Company Limited, Beijing (CN)

(72) Inventor: Likang Chen, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 187 days.

(21) Appl. No.: 15/965,438

(22) Filed: Apr. 27, 2018

(65) Prior Publication Data
US 2018/0246237 A1 Aug. 30, 2018

Related U.S. Application Data (63) Continuation of application No. PCT/CN2016/099827, filed on Sep. 23, 2016.

(30) Foreign Application Priority Data

Oct. 28, 2015 (CN) .......................... 2015 1 0711113

(51) Int. Cl.
G01V 1/18 (2006.01)
G01V 1/20 (2006.01)
G01V 1/28 (2006.01)

(52) U.S. Cl.
CPC ............. *G01V 1/181* (2013.01); *G01V 1/184* (2013.01); *G01V 1/20* (2013.01); *G01V 1/28* (2013.01)

(58) Field of Classification Search
CPC .......... G01V 1/181; G01V 1/184; G01V 1/28; G01V 1/20
See application file for complete search history.

(56) References Cited

U.S. PATENT DOCUMENTS 4,791,617 A 12/1988 Seymour
5,790,388 A 8/1998 Buckingham
(Continued)

FOREIGN PATENT DOCUMENTS

CN 2047790 U 11/1989
CN 2453455 Y 10/2001
(Continued)

OTHER PUBLICATIONS

Curtis, A., et al., "Wavefield separation and estimation of near surface velocities in land seismic," 62nd EAGE Conference & Exhibition, May 29, 2000.
(Continued)

*Primary Examiner* — Daniel Pihulic
(74) *Attorney, Agent, or Firm* — Hamilton, Brook, Smith & Reynolds, P.C.

(57) ABSTRACT

The invention discloses an omnidirectional vector geophone, comprising: eight wave detectors and support structures thereof, the support structures are used for supporting the eight wave detectors such that bottom surfaces of each two wave detectors are on one of regular triangle surfaces of a regular tetrahedron, crossing points of working shafts of the two wave detectors that are on the same regular triangle surface that cross with the regular triangle surface are both on an angular bisector of an angle of the regular triangle surface and are symmetric with respect to the center of the regular triangle surface. In the invention, based on divergence and curl equations of field theory, a particular spatial motion full-vector detection structure is designed to realize detection of full information including frequency, amplitude, phase, vibration direction of the seismic wave field, especially divergence and curl of a wave force field, to form a completely new omnidirectional vector geophone structure.

11 Claims, 8 Drawing Sheets

(56) References Cited

U.S. PATENT DOCUMENTS

| | | |
|---|---|---|
| 5,889,731 A | 3/1999 | Laurent |
| 6,291,901 B1 | 9/2001 | Cefo |
| 6,791,901 B1 | 9/2004 | Robertsson et al. |
| 2005/0090987 A1 | 4/2005 | Amundsen et al. |
| 2010/0116059 A1 | 5/2010 | Gan et al. |
| 2010/0195439 A1 | 8/2010 | Muyzert |
| 2011/0063946 A1 | 3/2011 | Muyzert et al. |
| 2014/0219053 A1 | 8/2014 | Goujon et al. |
| 2018/0246237 A1* | 8/2018 | Chen .................. G01V 1/20 |
| 2018/0246238 A1* | 8/2018 | Dong .................. G01V 1/181 |
| 2018/0267184 A1* | 9/2018 | Chen .................. G01V 1/184 |

FOREIGN PATENT DOCUMENTS

| | | | |
|---|---|---|---|
| CN | 1460867 A | 12/2003 | |
| CN | 1908674 A | 2/2007 | |
| CN | 101002088 A | 7/2007 | |
| CN | 201043915 Y | 4/2008 | |
| CN | 101893720 A | 11/2010 | |
| CN | 102023309 A | 4/2011 | |
| CN | 102053261 A | 5/2011 | |
| CN | 102095893 A | 6/2011 | |
| CN | 201852944 U | 6/2011 | |
| CN | 102341728 A | 2/2012 | |
| CN | 102692646 A | 9/2012 | |
| CN | 103048683 A | 4/2013 | |
| CN | 103513273 A | 1/2014 | |
| CN | 103645497 A | 3/2014 | |
| CN | 103675350 A | 3/2014 | |
| CN | 104237934 A | 12/2014 | |
| CN | 104808242 A | 7/2015 | |
| CN | 105259566 A | 1/2016 | |
| CN | 105388514 A | 3/2016 | |
| CN | 105467440 A | 4/2016 | |
| DE | 266183 A1 | 3/1989 | |
| EP | 3370089 A4 * | 6/2019 | |
| EP | 3370090 A4 * | 6/2019 | ............... G01V 1/20 |
| GB | 2358469 A | 7/2001 | |
| JP | 06313729 A | 11/1994 | |
| JP | 200610520 A | 1/2006 | |
| WO | 02/068996 A | 9/2002 | |
| WO | 2006/043046 A1 | 4/2006 | |
| WO | 2011032080 A2 | 3/2011 | |
| WO | 2012027160 A1 | 3/2012 | |
| WO | 2013092747 A1 | 6/2013 | |
| WO | WO-2017071440 A1 * | 5/2017 | ............... G01V 1/20 |

OTHER PUBLICATIONS

Toda, R., et al., "Electrostatically Levitated Spherical 3-Axis Accelerometer," IEEE, 2012.

Keyang, C. et al., "High-order high-density 3D multi-wave multi-component elastic wave field separating forward numerical simulation," Reservoir Evaluation and Development, vol. 3; No. 2; 6-13 (2013).

Li, C., "Development on multi-wave and multi-component seismic exploration technology," Resource Environment and Energy Saving & Disaster Reduction, vol. 7.

Peng'An, Q., "Analysis of the Study on Monolithic Multi-Dimensional Accelerometers," Chinese Journal of Scientific Instrument, vol. 28; No. 8; 39-42 (2007).

Qifeng, S. and Qizhen, D., "A review of the multi-component seismic data processing," Petroleum Exploration and Development, vol. 38; No. 1; 67-71 (2011).

Zhi-Yuan, L. et al., "Improved method of separating P-and S-waves using divergence and curl," Chinese Journal of Geophysics, vol. 56; No. 6; 2012-2021 (2013).

Robertsson, et al., "Wavefield separation using a volume distribution of three component recordings," Geophysical Research Letters, vol. 26, No. 18, pp. 2821-2824, Sep. 15, 1999.

Carrion, et al., "Detailed Modeling of Designs for the Polar Seismic TETwalker," Center for Remote Sensing of Ice Sheets, Technical Report, Nov. 8, 2007.

International Search Report dated Nov. 19, 2016 for International Application No. PCT/CN2016/099827 entitled Omni-Directional Vector Seismic Wave Detector.

Gui-Ian et al., "The Design of Three-component ALL-fiberoptic Acceleration Seismometer," Journal of Optoelectronics Laser vol. 13 No. 1 Jan. 2002.

J. Robertsson and A. Curtis, "Wavefield separation using densely deployed three-component single-sensor groups in land surface-seismic recordings," Geophysics vol. 67, No. 5, 1624-1633 Sep./Oct. 2002.

M. B.Dobrin, "Detector," An overview of geophysical exploration, 62-65 1993.

Bangliu et al., "Technical Theory and Practice for Multi-component Seismic Exploration," Theory and practice of multi component seismic exploration technology, 77-78 2007.

H. Lixin, "Detector Coupling Theories and Experiments," Theory and experiment of geophone coupling, 2009.

Chinese Search Report dated Mar. 20, 2017 for Application No. 2015107111137 filed Oct. 28, 2015.

* cited by examiner

OMNIDIRECTIONAL VECTOR GEOPHONE

RELATED APPLICATIONS

This application is a continuation of International Application No. PCT/CN2016/099827, filed Sep. 23, 2016, which designates the U.S., published in Chinese, and claims priority under 35 U.S.C. § 119 or 365(c) to Chinese Application No. 201510711113.7, filed on Oct. 28, 2015. The entire teachings of the above applications are incorporated herein by reference.

TECHNICAL FIELD

The invention relates to the technical field of a geophone, in particular to an omnidirectional vector geophone wave detector.

BACKGROUND

According to wave theory, wave means not only vibration but also propagation of the vibration. To be specific, 1. vibration can be decomposed into translational vibration, rotational vibration; 2. wave field divergence drives pressure wave, and wave field curl drives shear wave; 3. translational vibration is a combined action of divergence and curl, including not only pressure wave but also shear wave; 4. rotational vibration is related only to curl; 5. volume curl is complete curl, and surface curl is incomplete curl. Accordingly, a technology that can only detect translational vibration cannot completely separate pressure wave from shear wave. Only a technology that can detect volume curl or divergence can work out pure shear wave and pure pressure wave.

Spatial motion properties of wave include abundant information, which play important roles in aspects such as wave field separation, signal-to-noise ratio, fidelity, imaging precision, medium attribute analysis, or the like. However, the existing acquisition technology can only detect information such as amplitude, frequency, phase or the like, and could not detect the spatial properties of wave motions.

Currently, detection of seismic wave is realized by converting wave vibration into an electric signal (voltage, current) or then converting the electric signal into a digital signal. A method of converting mechanical motion into an electric signal applies nothing more than an electromagnetic detector, a capacitance detector, a piezoelectric detector and a fiber optic strain detector.

The electromagnetic detector and the capacitance detector are of line-vibration type and have working direction. Ideal direction filtering effect is cos θ, out(t)=A(t)cos θ. A(t) and θ are both unknown, only a single device cannot work out the true amplitude A(t) and the angle θ. An MEMS detector basically belongs to a capacitance detector, which also follows the above rule.

The fiber optic strain detector may be line-vibration or pressure-intensity type, and only a single device cannot determine vibration direction either. Accordingly, a single electromagnetic detector, a single capacitance detector or a single fiber optic strain detector cannot distinguish wave field vibration direction, even not having the function of detecting wave field divergence or curl.

The piezoelectric detector is of pressure-intensity type, and the output is related to pressure intensity of surrounding liquid medium, which is non-directional and cannot distinguish vibration direction. Pressure intensity in a liquid environment is isotropic and is equivalent to wave field divergence. But in a terrestrial solid environment, even if the detector is put in a liquid container, the detector still fails to realize divergence measurement.

A three component detector can work out wave field vibration direction θ and amplitude A(t) by a three-vector combination method. This is also the reason why the three component detector is called a vector detector, but it only measure translational vibration vector of a point, cannot detect nature, curl and divergence of vibration.

In conclusion, various wave detectors in the prior art cannot realize detection of full information of the seismic wave field.

Figure 1:
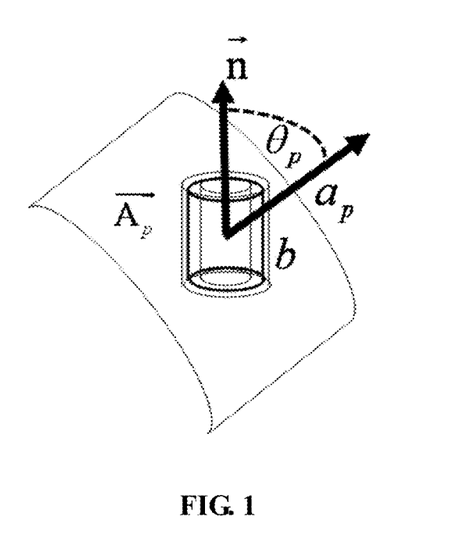
FIG. 1 is a schematic diagram of directional response of an ideal single wave detector in a pressure wave field in related art.
Figure 2:
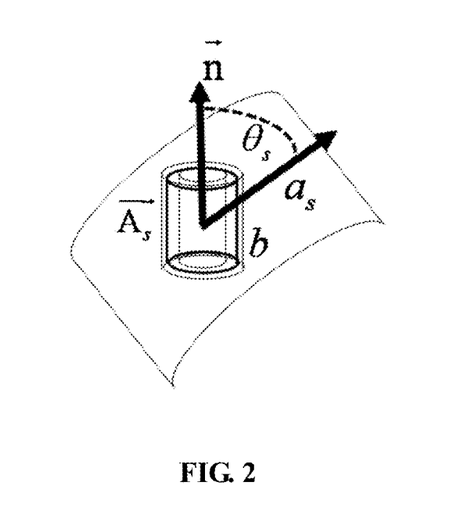
FIG. 2 is a schematic diagram of directional response of the ideal single wave detector in a shear wave field in related art.

FIG. 1 is a schematic diagram of directional response of an ideal single wave detector in a pressure wave field in related art, and FIG. 2 is a schematic diagram of directional response of the ideal single wave detector in a shear wave field in related art, for describing operating directivity of the wave detector. As shown in FIGS. 1 and 2, the output of a wave detector is realized based on the formula: out=A·n=a×b cos θ. Wherein, A denotes wave field function and vector; n denotes a unit vector of the wave detector in the operating directivity; a denotes instantaneous amplitude of a wave field A in a vibration direction; b denotes sensitivity of the wave detector; θ denotes an angle between the operating direction of the wave detector and the vibration direction of the wave field at position of the wave detector; p denotes a pressure wave subscript; S denotes a shear wave subscript.

Specifically as shown in FIG. 1, the output of a wave detector in the pressure wave field is realized based on the following formula:

out=% $A_p$·n=$a_p$×b cos $θ_p$; wherein, $A_p$ denotes an isochronous surface of the pressure wave field; $a_p$ denotes an instantaneous displacement of the wave field $A_p$ in a normal direction at the position of the wave detector; b denotes sensitivity of the wave detector; $θ_p$ denotes an angle between the operating direction of the wave detector and the vibration direction of the wave field.

As shown in FIG. 2, the output of a wave detector in the shear wave field is realized based on the following formula:

out=$A_s$·n=$a_s$×b cos $θ_s$; wherein, $A_s$ denotes an isochronous surface of the shear wave field; $a_s$ denotes an instantaneous displacement of the wave field $A_s$ in a vibration vector direction at the position of the wave detector; b denotes sensitivity of the wave detector; $θ_s$ denotes an angle between the operating direction of the wave detector and the vibration direction of the wave field.

FIGS. 1 and 2 and the above formulas do not include other specification of an electromagnetic capacitance wave detector, only include directional description. The above formulas are only used for describing a single wave detector, which satisfies directional requirement of multi-dimensional space structure.

Seismic wave detection flow in traditional technology is as below:

Based on a wave equation, medium mass points satisfy the following movement relationship as in equation (1):

$$\rho \frac{\partial^2 \vec{U}}{\partial t^2} = (\lambda + \mu) grad\theta + \mu \nabla^2 \vec{U} + \rho \vec{F} \tag{1}$$

wherein, λ, μ denote Lamé constants, ρ denotes density, U denotes displacement vector, and t denotes time.

$\vec{F}$ denotes an external force vector, $\vec{F} = f_x \vec{i} + f_y \vec{j} + f_z \vec{k}$.

$\nabla^2$ denotes Laplace operator, $$\nabla^2 = \frac{\partial^2}{\partial x^2} + \frac{\partial^2}{\partial y^2} + \frac{\partial^2}{\partial z^2}.$$

θ denotes a volumetric coefficient, $$\theta = div\vec{U} = \frac{\partial u}{\partial x} + \frac{\partial v}{\partial y} + \frac{\partial w}{\partial z}.$$

Solving divergence from the equation (1), to obtain the following equation (2):

$$\frac{\partial^2 \theta}{\partial t^2} - V_p^2 \nabla^2 \theta = \frac{\partial^2 \theta}{\partial t^2} - \frac{\lambda + 2\mu}{\rho} \nabla^2 \theta = div\vec{F} \qquad (2)$$

wherein, div denote divergence, and $V_p$ denotes pressure wave propagation velocity.

Solving curl from the equation (1), to obtain the following equation (3):

$$\frac{\partial^2 \vec{w}}{\partial t^2} - V_s^2 \nabla^2 \vec{w} = \frac{\partial^2 \vec{w}}{\partial t^2} - \frac{\mu}{\rho} \nabla^2 \vec{w} = rot\vec{F} \qquad (3)$$

wherein, rot denotes curl. w=rot(U), $V_s$ denotes pressure wave propagation velocity.

In traditional technology, detection of seismic wave merely refers to acquired of a projection of $\vec{U}$(t, x, y, z) on a vertical working direction of the wave detector, but not $\vec{U}$. Then various equations are derived according to the equation (2) to obtain the pressure wave; a projection of $\vec{U}$(t, x, y, z) in horizontal working direction of the detector is collected, then various equations are derived according to the equation (3) to obtain the shear wave. Joint solving and joint inversion are performed on the basis of these errors. Accordingly, the error is obvious.

As for the problem of big error in detection of full information of the seismic wave field in the prior art, there has not yet come up with an effective solution.

SUMMARY

The invention provides an omnidirectional vector geophone, to solve at least the problem of big error in detection of full information of the seismic wave field in the prior art.

According to an aspect of the invention, there is provided with an omnidirectional vector geophone, comprising: eight wave detectors and support structures thereof, the support structures are used for supporting the eight wave detectors such that bottom surfaces of each two wave detectors are on one of regular triangle surfaces of a regular tetrahedron, crossing points of working shafts of the two wave detectors that are on the same regular triangle surface that cross with the regular triangle surface are both on an angular bisector of an angle of the regular triangle surface and are symmetric with respect to the center of the regular triangle surface.

Preferably, letting that one of regular triangle surfaces of the regular tetrahedron is a main triangle surface; one of the angles of the main triangle surface is a first vertex angle of the regular tetrahedron, crossing points of working shafts of two wave detectors that are on the main triangle surface that cross with the main triangle surface are both on an angular bisector of the first vertex angle;

letting that the other surface of the regular tetrahedron where a bottom edge opposite to the first vertex angle is a first side surface of the regular tetrahedron, a midpoint of the bottom edge slides along an anticlockwise direction on the main triangle surface to meet an angle on the first side surface that is defined as a second vertex angle; crossing points of working shafts of two wave detectors on the first side surface that cross with the first side surface are both on an angular bisector of the second vertex angle;

letting that the other surface of the regular tetrahedron where a bottom edge opposite to the second vertex angle is a second side surface of the regular tetrahedron, a midpoint of the bottom edge slides along a clockwise direction on the first side surface to meet an angle on the second side surface that is defined as a third vertex angle; crossing points of working shafts of two wave detectors on the second side surface that cross with the second side surface are both on an angular bisector of the third vertex angle;

letting that the other surface of the regular tetrahedron where a bottom edge opposite to the third vertex angle is a third side surface of the regular tetrahedron, a midpoint of the bottom edge slides along an anticlockwise direction on the second side surface to meet an angle on the third side surface that is defined as a fourth vertex angle; crossing points of working shafts of two wave detectors on the third side surface that cross with the third side surface are both on an angular bisector of the fourth vertex angle;

or, letting that the first vertex angle, the second vertex angle, the third vertex angle and the fourth vertex angle correspond to a first vertex, a second vertex, a third vertex and a fourth vertex of the regular tetrahedron respectively; crossing points of working shafts of two wave detectors that are on the main triangle surface that cross with the main triangle surface are both on an angular bisector of the first vertex angle; crossing points of working shafts of two wave detectors on the first side surface that cross with the first side surface are both on an angular bisector of an angle of the third vertex that is on the first side surface; crossing points of working shafts of two wave detectors on the second side surface that cross with the second side surface are both on an angular bisector of an angle of the fourth vertex that is on the second side surface; and crossing points of working shafts of two wave detectors on the third side surface that cross with the third side surface are both on an angular bisector of an angle of the second vertex that is on the third side surface.

Preferably, the wave detector is a cylindrical electromagnetic type wave detector, a distance from a bottom surface of each cylindrical electromagnetic type wave detector to the tetrahedron geometric center of the regular tetrahedron is a minimum value by which the wave detectors do not contact with each other.

Preferably, the wave detector is a flat sheet capacitor type wave detector.

Preferably, eight space vectors of the eight wave detectors conform to a stokes' integral formula.

Preferably, amplitude response of the wave detector and an angle θ between a working shaft of the wave detector and a wave field normal are in such a relationship: out(t)=A(t) cos θ, wherein A(t) is response of the wave detector to the wave field when θ=0.

Preferably, a conical tail cone is connected on a support structure, an extension line of an axis of the conical tail cone passes through one vertex of the regular tetrahedron and vertically penetrates through the center of one of the surfaces of the regular tetrahedron.

Preferably, the omnidirectional vector geophone may further comprise: a spherical shell which is divided into an upper-half spherical shell and a lower-half spherical shell, eight wave detectors and the support structure are placed inside the spherical shell, the lower-half spherical shell is provided with a tail cone hole at the bottom, and the above tail cone passes through the tail cone hole of the lower-half spherical shell.

Preferably, the upper-half spherical shell and the lower-half spherical shell are respectively provided on edges thereof with projections that are matched with each other, the projections of the upper-half spherical shell and the lower-half spherical shell are fixed by a fixing assembly.

Preferably, a signal line hole is provided on the spherical shell, signal output lines of the wave detectors pass through the signal line hole.

Preferably, waterproof may be sealed by a silicone or rubber material at the joint gap between the upper-half spherical shell and the lower-half spherical shell of the spherical shell, the tail cone hole and the signal line hole.

Preferably, the support structure is a regular tetrahedron support structure, each surface of the regular tetrahedron support structure is any curved surface or a plane.

In the invention, based on divergence and curl equations of field theory, a particular spatial motion full-vector detection structure is designed to realize detection of full information including frequency, amplitude, phase, vibration direction of the seismic wave field, especially divergence and curl of a wave force field, to form a brand-new omnidirectional vector geophone technology.

On the basis of the technical solution of the invention, the following purposes can be achieved:

1. adding functions of measuring divergence, curl, line vector and curl vector of the seismic wave, on the basis of function of a traditional wave detector;
2. improving degree of purity of pressure and shear waves separation;
3. improving the signal-to-noise ratio of seismic data collected on land, especially mountainous areas;
4. improving fidelity of the seismic data;
5. improving accuracy and reliability of rock and fluid prediction;
6. providing seismic data basis for a fully elastic wave theory.

BRIEF DESCRIPTION OF THE DRAWINGS

The drawings described here are used for providing further understanding to the present invention and constitute a part of the present application, and schematic embodiments of the invention and the description thereof are used for explaining the invention and do not constitute definition to the invention. In the drawings.

DETAILED DESCRIPTION

Hereinafter the technical solution in the embodiments of the present invention will be described clearly and integrally in combination with the accompanying drawings in the embodiments of the present invention, and obviously the described embodiments are merely part of the embodiments, not all of the embodiments. Based on the embodiments of the present invention, all other embodiments that are obtained by persons skilled in the art without making creative efforts fall within the protection scope of the present invention.

The invention provides an omnidirectional vector geophone, which is omni-directionally evenly balanced in terms of spatial structure, this is a structural advantage that none of wave detectors in the prior art possesses, and accurate detection of full information of seismic wave field can be realized by the structural advantage. Specific structure of the omnidirectional vector geophone is introduced below.

Figure 3:
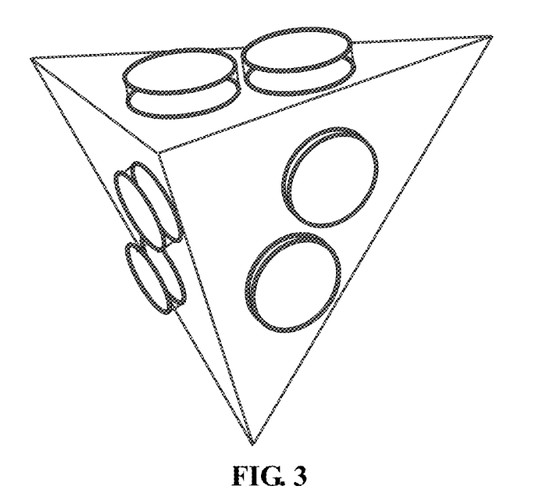
FIG. 3 is a structural schematic diagram of an omnidirectional vector geophone based on an embodiment of the invention.

An embodiment of the invention provides an omnidirectional vector geophone. FIG. 3 is a structural schematic diagram of an omnidirectional vector geophone based on an embodiment of the invention, as shown in FIG. 3, the omnidirectional vector geophone comprises: eight wave detectors and support structures thereof, the eight wave detectors are divided into four groups each including two wave detectors, the support structures are used for supporting the eight wave detectors such that bottom surfaces of two wave detectors of each group are on one of regular triangle surfaces of a regular tetrahedron, crossing points of working shafts of the two wave detectors that are on the same regular triangle surface that cross with the regular triangle surface are both on an angular bisector of an angle of the regular triangle surface and are symmetric with respect to the center of the regular triangle surface.

It is necessary to explain that the above working shafts are virtual shafts for describing positional relationship. In practical application, a working shaft of a wave detector is not necessarily in a central position of the wave detector (i.e., a center shaft). The above-described regular tetrahedron is not a solid structure but a virtual spatial structure, aiming to describe positional relationship between the eight wave detectors.

In the embodiment, based on divergence and curl equations of field theory, a particular spatial motion full-vector detection structure is designed to realize detection of full information including frequency, amplitude, phase, vibration direction of the seismic wave field, especially divergence and curl of a wave force field, to form a brand-new omnidirectional vector geophone technology.

A support structure of the omnidirectional vector geophone can be designed into any shape as demanded, which is not limited in the invention as long as space vector form can be ensured. Preferably, the omnidirectional vector geophone can be designed into shape of a regular tetrahedron, size of a support structure of which is generally larger than that of the above virtual regular tetrahedron. preferably, each surface of the support structure of the regular tetrahedron can be changed into any curved surface so as to satisfy different demands. Material of the support structure is not limited to be solid, rigidity of the support structure is related to the measured result, so that different materials can be selected as demanded.

In the embodiment, there are two wave detectors on each regular triangle surface of the regular tetrahedron, and normal operation of the omnidirectional vector geophone can be ensured only when putting positions of these two wave detectors on the regular triangle surface meet certain requirements. There are at least two ways of placing the two wave detectors on each regular triangle surface, which will be introduced respectively below.

Figure 4:
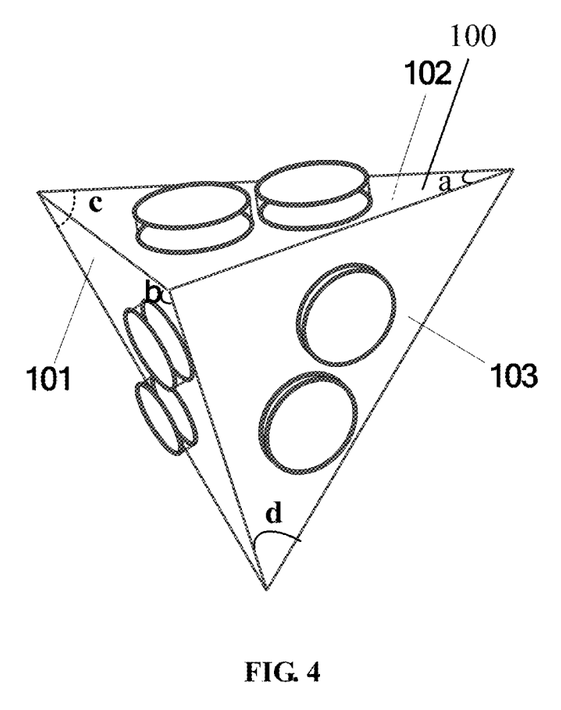
FIG. 4 is a first kind of structural schematic diagram of an omnidirectional vector geophone based on an embodiment of the invention.

1) FIG. 4 is a first kind of structural schematic diagram of an omnidirectional vector geophone based on an embodiment of the invention, FIG. 4 makes introduction taking an example that the support structure is of shape of a regular tetrahedron, as shown in FIG. 4, letting one of regular triangle surfaces of the regular tetrahedron to be a main triangle surface 100 whose one angle is defined as a first vertex angle a of the regular tetrahedron, crossing points of working shafts of two wave detectors on the main triangle surface 100 that cross with the main triangle surface 100 are both on an angular bisector of the first vertex angle a.

The other surface of the regular tetrahedron where a base opposite to the first vertex angle a is defined as a first side surface 101 of the regular tetrahedron, a midpoint of the base slides along an anticlockwise direction on the main triangle surface 100 to meet an angle on the first side surface 101 that is defined as a second vertex angle b, crossing points of working shafts of two wave detectors on the first side surface 101 that cross with the first side surface 101 are both on an angular bisector of the second vertex angle b.

It is necessary to explain that, the above-described anticlockwise direction is an anticlockwise direction when the main triangle surface 100 is placed horizontally upwards and a person faces the first side surface 101, and an anticlockwise direction and a clockwise direction mentioned below both adopt this method.

The other surface of the regular tetrahedron where a base opposite to the second vertex angle b is defined as a second side surface 102 of the regular tetrahedron, a midpoint of the base slides along a clockwise direction on the first side surface 101 to meet an angle on the second side surface 102 that is defined as a third vertex angle c, crossing points of working shafts of two wave detectors on the second side surface 102 that cross with the second side surface 102 are both on an angular bisector of the third vertex angle c.

The other surface of the regular tetrahedron where a base opposite to the third vertex angle c is defined as a third side surface 103 of the regular tetrahedron, a midpoint of the base slides along an anticlockwise direction on the second side surface 102 to meet an angle on the third side surface 103 that is defined as a fourth vertex angle d, crossing points of working shafts of two wave detectors on the third side surface 103 that cross with the third side surface 103 are both on an angular bisector of the fourth vertex angle d.

Figure 5:
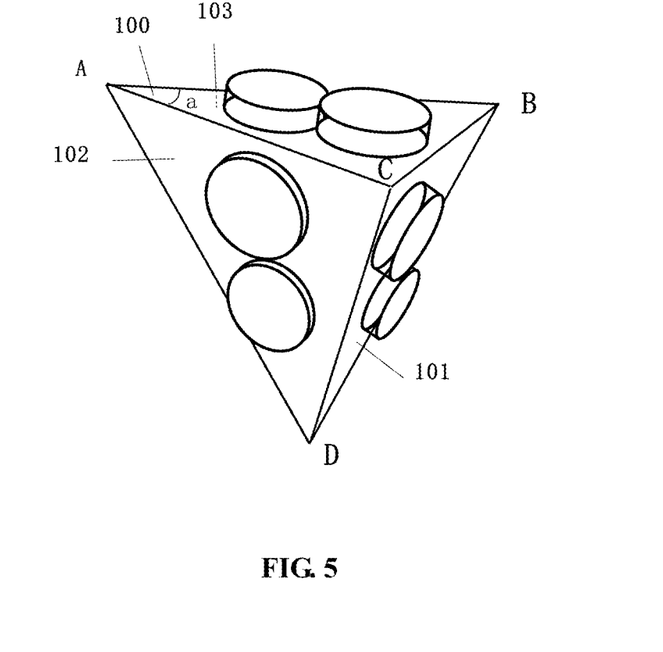
FIG. 5 is a second kind of structural schematic diagram of an omnidirectional vector geophone based on an embodiment of the invention.

2) FIG. 5 is a second kind of structural schematic diagram of an omnidirectional vector geophone based on an embodiment of the invention, FIG. 5 makes introduction taking an example that the support structure is of shape of a regular tetrahedron, as shown in FIG. 5, the above-described first vertex angle a, second vertex angle b, third vertex angle c and fourth vertex angle d correspond respectively to a first vertex A, a second vertex B, a third vertex C and a fourth vertex D of the regular tetrahedron.

Crossing points of working shafts of two wave detectors on the main triangle surface 100 that cross with the main triangle surface 100 are both on an angular bisector of the first vertex angle a;

crossing points of working shafts of two wave detectors on the first side surface 101 that cross with the first side surface 101 are both on an angular bisector of an angle of the third vertex C on the first side surface 101;

crossing points of working shafts of two wave detectors on the second side surface 102 that cross with the second side surface 102 are both on an angular bisector of an angle of the fourth vertex D on the second side surface 102;

crossing points of working shafts of two wave detectors on the third side surface 103 that cross with the third side surface 103 are both on an angular bisector of an angle of the second vertex D on the third side surface 103.

The above-described two ways of placing can also be realized by the following methods:

1) Four regular triangle surfaces of the regular tetrahedron are respectively provided with a unique straight line that connects an angle, a surface geometric center and a midpoint of an opposite edge (i.e., the corresponding base). The regular tetrahedron is disposed with one surface facing upwards (i.e., the above-described main triangle surface), a connection line of the tetrahedron geometric center and the geometric center of this surface is vertically upward and defined as a vertical shaft (also called a main shaft) of the omnidirectional vector geophone, and is also a first line vector axis, direction of the above-described straight line that is disposed on the surface facing upwards is defined as a from-north (also called a first direction) of the omnidirectional vector geophone. The angle on the first side surface that is met when sliding anticlockwise along an arris (i.e., a bottom edge) that vertically crosses the from-north points to a midpoint of an opposite arris in a direction which is defined as a second direction, and the angle on the second side surface that is met when sliding clockwise along an arris that vertically crosses the second direction points to a midpoint of an opposite arris in a direction which is defined as a third direction, and the angle on the third side surface that is met when sliding anticlockwise along an arris that vertically crosses the third direction points to a midpoint of an opposite arris in a direction which is defined as a fourth direction.

On each of directional lines along the above-described four directions, a high-sensitivity wide band full tilt detector whose working direction is vertical to the regular triangle surface is installed by moving from the center of each regular triangle surface to the angle and the arris by a (wherein, $0<a<\lambda/4$, $\lambda$ is wavelength).

2) On the above-described surface disposed to face upwards, the angle that is met when sliding clockwise along an arris that vertically crosses the above-described from-north points to a midpoint of an opposite arris in a direction which is defined as a fifth direction, and the angle that is met when sliding anticlockwise along an arris that vertically crosses the fifth direction points to a midpoint of an opposite arris in a direction which is defined as a sixth direction, and the angle that is met when sliding clockwise along an arris that vertically crosses the sixth direction points to a midpoint of an opposite arris in a direction which is defined as a seventh direction.

On each of directional lines along the above-described four directions, a high-sensitivity wide band full tilt detector whose working direction is vertical to the regular triangle surface is installed by moving from the center of each regular triangle surface to the angle and the arris by a (wherein, $0<a<\lambda/4$, $\lambda$ is wavelength).

The wave detector in the embodiment can at least be a cylindrical electromagnetic type wave detector, which needs to satisfy: a distance from a bottom surface of each cylindrical electromagnetic type wave detector to the tetrahedron geometric center of the regular tetrahedron is a minimum value by which the wave detectors do not contact with each other; or may be a flat sheet capacitor type wave detector. Of course, the wave detector may also be other types of wave detectors as long as it can operate normally in the omnidirectional vector geophone, and this is not limited in the invention.

Figure 6:
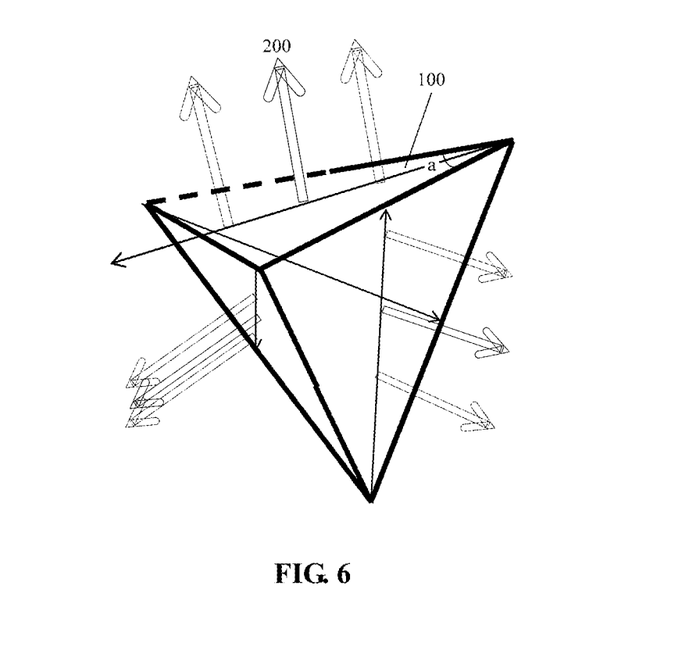
FIG. 6 is a schematic diagram of work vector of a first kind of structure of an omnidirectional vector geophone based on an embodiment of the invention.
Figure 7:
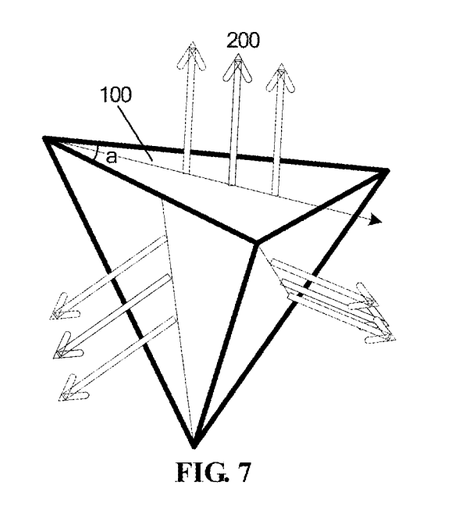
FIG. 7 is a schematic diagram of work vector of a second kind of structure of an omnidirectional vector geophone based on an embodiment of the invention.

FIG. 6 is a schematic diagram of work vector of a first kind of structure of an omnidirectional vector geophone based on an embodiment of the invention, FIG. 7 is a schematic diagram of work vector of a second kind of structure of an omnidirectional vector geophone based on an embodiment of the invention. The arrow on each surface in FIGS. 6 and 7 indicates a working vector, a center shaft vertical to the main triangle surface 100 is disposed to be a main shaft 200, an angular bisector of the first vertex angle a on the main triangle surface 100 is in a direction which is defined as a from-north.

Figure 8:
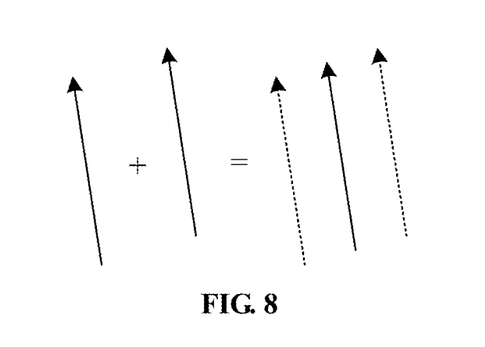
FIG. 8 is a schematic diagram of parallel vectors based on an embodiment of the invention.

FIG. 8 is a schematic diagram of parallel vectors based on an embodiment of the invention. As shown in FIG. 8, in a smooth continuous wave field, the distance is far less than a sum of dot products of two parallel vectors of the wavelength with the wave field that is divided by 2, and is equal to a dot product of a vector at a middle position with the wave field.

Figure 9:
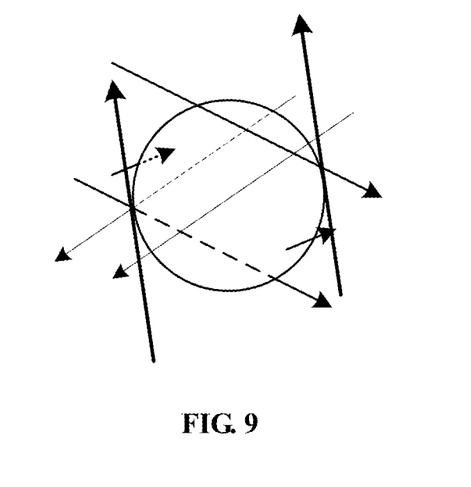
FIG. 9 is a space vector relationship diagram of an omnidirectional vector geophone based on an embodiment of the invention.

FIG. 9 is a space vector relationship diagram of an omnidirectional vector geophone based on an embodiment of the invention. As shown in FIG. 9, the individual arrows indicate a working vector on each surface. The circle in FIG. 9 indicates an inner tangent sphere that is enclosed by eight space vectors of the omnidirectional vector geophone.

A plurality of wave detectors having directivities shown in FIG. 1 are combined based on in a space vector direction as shown in FIG. 1, namely a space vector relationship shown in FIG. 9, which can have the function of an omnidirectional space vector. Such structure has functions of detecting a space line vector, a curl vector and divergence.

Figure 10:
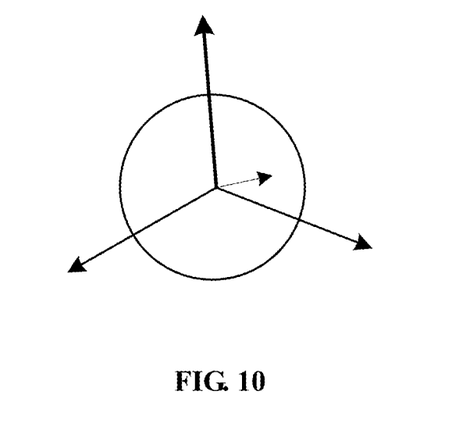
FIG. 10 is a structural schematic diagram of total integral equivalent Gaussian divergence based on an embodiment of the invention.
Figure 11:
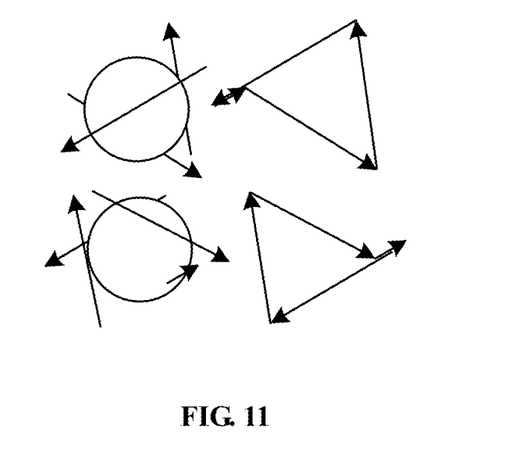
FIG. 11 is a structural schematic diagram of stokes' integral positive and negative curl equivalence based on an embodiment of the invention.

FIG. 10 is a structural schematic diagram of total integral equivalent Gaussian divergence based on an embodiment of the invention, FIG. 11 is a structural schematic diagram of stokes' integral positive and negative curl equivalence based on an embodiment of the invention. It can be seen from the vector relationship as shown in FIGS. 10 and 11 that:

Based on Divergence Gaussian theorem:

$$\int\int_V\int divAdv = \iint_S A \cdot ndS,$$

a divergence formula of the omnidirectional vector geophone in the embodiment of the invention can be obtained:

$$\int\int_V\int divAdv = \iint_S A \cdot ndS = \frac{1}{m}\sum_{i=1}^m A \cdot n_i.$$

Based on Curl Stokes' formula:

$$\int\int_s rotA \cdot dS = \int\int_s rotA \cdot ndS = \oint A \cdot dl,$$

a positive curl formula of the embodiment can be obtained as:

$$\int\int_S rotAdS = \oint A \cdot dl = \frac{1}{m}\sum_{i=1}^m A \cdot \vec{l}_i,$$

as well as an anti-curl formula:

$$-\int\int_S rotAdS = -\oint A \cdot dl = \frac{1}{m}\sum_{i=m+1}^{2m} A \cdot \vec{l}_i.$$

Wherein, A is a wave field function, 1 is a detector response vector, i is an inner trace serial number of the detector, trace(i)=A·$\vec{l}_i$ is the collected internal trace data of the ith trace, on the above-described total integral equivalent Gaussian divergence structure: $\vec{l}_i$ is a first group, i=1-4, $\vec{l}_i$ is a second group, i=5-8. div indicates divergence, rot indicates curl, V indicates volume, dv indicates differential volume, S indicates area, dS indicates differential of area, m indicates the number of a regular m-hedron; $n_i$ indicates a wave response vector on a normal of the ith surface. Based on the trigonometric and differential product formulas, on the specific structure, $$\vec{l}_i + \overrightarrow{l_{m+i}} = \vec{l}_i + \vec{l}_i = 2n_i.$$

It is necessary to explain that, the omnidirectional vector geophone provided by the invention is a four-equational stereo-space equilibrium structure that is formed based on four shafts of a virtual regular tetrahedron (i.e., a stereo star-shaped shaft formed by connection lines of the tetrahedron center of the regular tetrahedron and centers of four regular triangle surfaces). A distance from a bottom surface of each wave detector to the tetrahedron center is denoted as d, and d is a minimum value by which the units and devices do not contact with each other, two high-sensitivity wide band full tilt detectors are installed on each regular triangle surface of the regular tetrahedron to be parallel to the shaft, and its amplitude response has a relationship with a working shaft thereof and an angle θ between wave field normals as below: out(t)=A(t)cos θ, wherein A(t) denotes response of the detector to the wave field when θ=0.

In the omnidirectional vector geophone, detectors on each regular triangle surface that are close to the corners belong to A group, detectors that are close to the arris (i.e., opposite edge) belong to B group, the A or B group of detectors spatially form a closed loop that conforms to the Curl Stokes' formula. The A group of output is positive curl, and the B group of output is negative curl.

An arithmetic sum of two wave detectors on the same regular triangle surface is equivalent to a wave detector at the center of each regular triangle surface in the case that a is smaller than λ/4, four measurement vectors that point to the tetrahedron center of the regular tetrahedron are formed, which is completely consistent with the requirement of the Gaussian divergence formula.

In this embodiment, the stokes' curl structure and the Gaussian divergence structure are combined perfectly, thus a total vector seismic measurement spatial structure with curl combined with divergence is formed.

Figure 12:
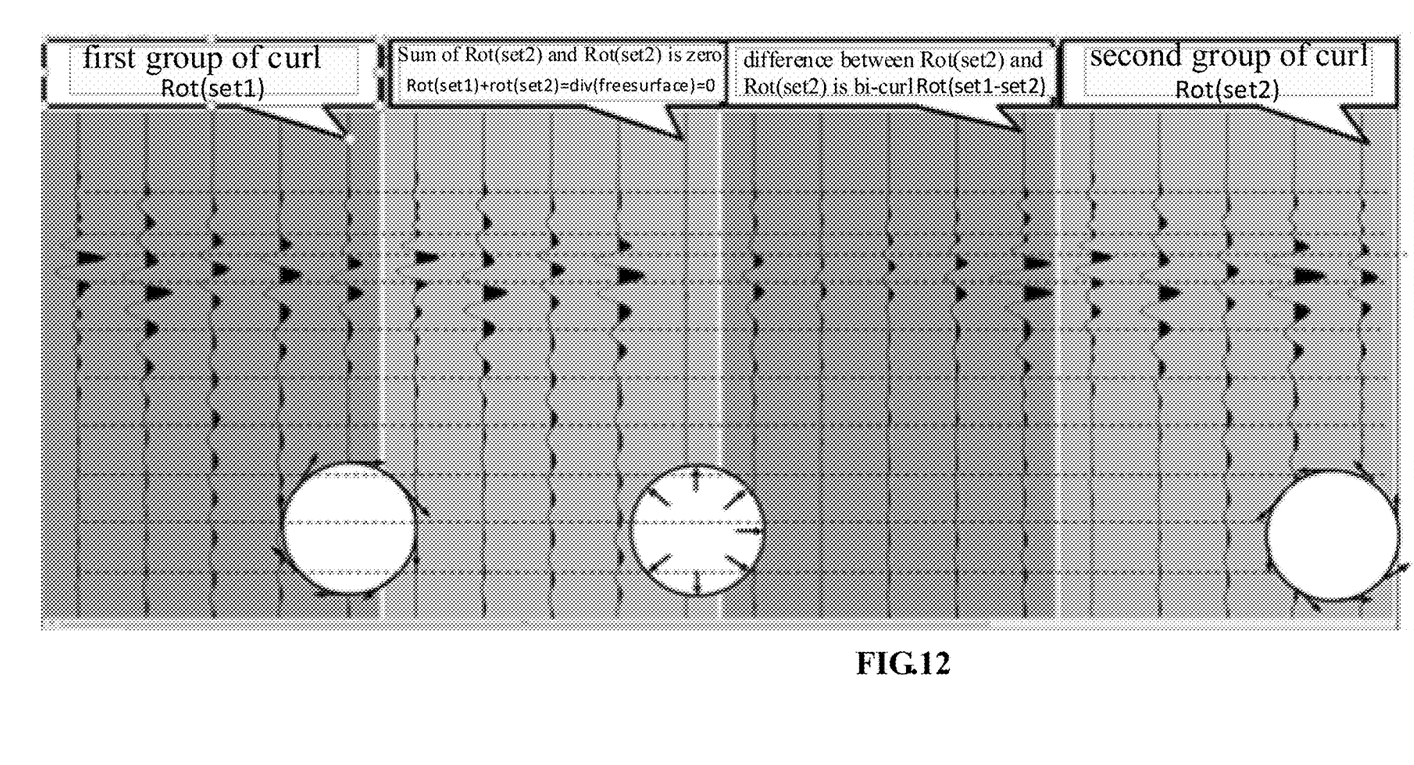
FIG. 12 is a schematic diagram of actually measured output of an omnidirectional vector geophone based on an embodiment of the invention.

The omnidirectional vector geophone includes eight wave detectors, the A and B groups of wave detectors output totally eight tracks of data. FIG. 12 is a schematic diagram of actually measured output of an omnidirectional vector geophone based on an embodiment of the invention. As shown in FIG. 12, four output results of the above first circuit correspond to a first group of curl as shown in FIG. 12, and four output results of the above second circuit correspond to a second group of curl as shown in FIG. 12. Sum of the first group of curl and the second group of curl is zero, and difference between the first group of curl and the second group of curl is bi-curl. Curl vector direction of the omnidirectional vector geophone is determined by One-spin-to-Two right-hand rule, a total curl vector direction can be calculated by vector operation. A vibration line vector can be obtained by calculating redundant vectors, and is equal to a vibration line vector calculated by a traditional three-component wave detector. By applying the method of solving a shear wave vibration line vector by curl, a pure shear wave line vector can be solved, and a pure pressure wave vibration line vector can be obtained by reducing the pure shear wave line vector from total vibration line vector.

Specific structure of the omnidirectional vector geophone has been described in detail in the above, in practical application process, in order to facilitate placement, a conical tail cone is connected on a support structure of the omnidirectional vector geophone, an extension line of an axis of the conical tail cone passes through one vertex of the regular tetrahedron and vertically penetrates through the center of one of the surfaces of the regular tetrahedron. In normal use process, the conical tail cone is vertically inserted downwards into the ground, so as to be fixed.

Figure 13:
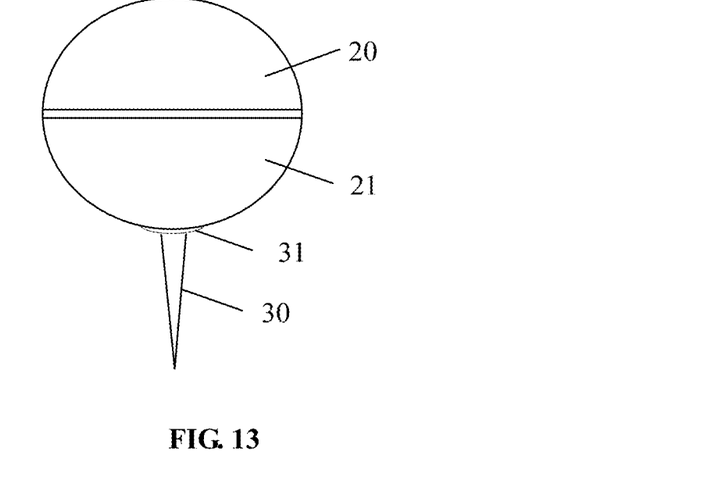
FIG. 13 is a schematic diagram of spherical shell appearance of an omnidirectional vector geophone based on an embodiment of the invention.

The omnidirectional vector geophone can also be provided with a spherical shell which is divided into an upper-half spherical shell and a lower-half spherical shell. Eight wave detectors and the support structure are placed inside the spherical shell, the lower-half spherical shell is provided with a tail cone hole at the bottom, and the above tail cone passes through the tail cone hole of the lower-half spherical shell. FIG. 13 is a schematic diagram of spherical shell appearance of an omnidirectional vector geophone based on an embodiment of the invention. As shown in FIG. 13, the spherical shell of the omnidirectional vector geophone is divided into an upper-half spherical shell 20 and a lower-half spherical shell 21. A conical tail cone 30 connected on the support structure of the omnidirectional vector geophone passes through a tail cone hole 31 that is disposed at the bottom of the lower-half spherical shell 21. By the preferable embodiment, the wave detector can be protected to stabilize the omnidirectional vector geophone.

Figure 14:
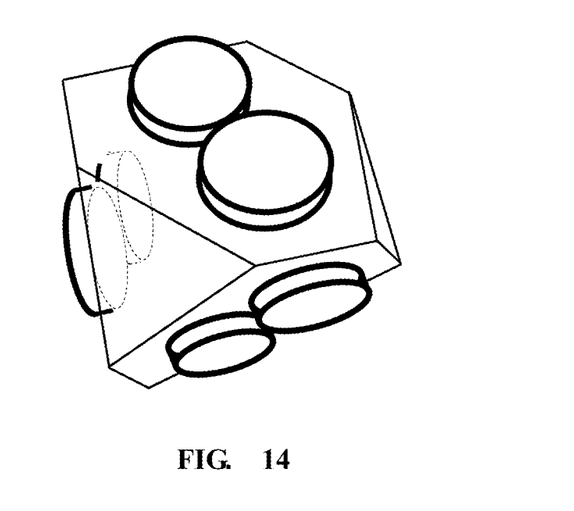
FIG. 14 is a schematic diagram of appearance of an omnidirectional vector geophone based on an embodiment of the invention.

In order to put the support structure and the eight wave detectors thereon of the omnidirectional vector geophone stably in the spherical shell, shape of the support structure can be designed into a shape that can be put into the spherical shell easily. FIG. 14 is a schematic diagram of appearance of an omnidirectional vector geophone based on an embodiment of the invention. As shown in FIG. 14, the vertexes of the support structure of regular tetrahedron shape are cut off by a piece such that the support structure can be easily placed in the spherical shell to ensure accuracy of the collected data of the omnidirectional vector geophone.

In consideration of fixation of the upper-half spherical shell and the lower-half spherical shell, the embodiment provides a preferable embodiment, namely: the upper-half spherical shell and the lower-half spherical shell are respectively provided on edges thereof with projections that are matched with each other, the projections of the upper-half spherical shell and the lower-half spherical shell are fixed by a fixing assembly, for example, being fixed by a screw and a screw hole. Thus stability of the omnidirectional vector geophone in practical operation process can be ensured.

For a signal output line of the omnidirectional vector geophone, a signal line hole can be provided on the spherical shell such that the signal output line of the wave detector passes through the signal line hole, so as to be convenient for the signal output line to be output to outside of the shell to effectively obtain the data.

In order to avoid water flooding into the omnidirectional vector geophone to effect use, waterproof may be sealed at the joint gap between the upper-half spherical shell and the lower-half spherical shell of the spherical shell, the tail cone hole and the signal line hole, for example, silica gel or rubber materials may be selected for sealing, so as to improve sealing performance of the omnidirectional vector geophone.

The omnidirectional vector geophone provided by the invention may be applied in the following aspects: land based artificial seismic exploration and natural seismic detection. The invention has the following application prospect: the omnidirectional vector geophone based on the invention can detect curl of seismic wave and can obtain vibration direction and real amplitude of the wave field, can decompose out pure pressure and shear waves, and thus can obtain abundant seismic wave information never seen before, thereby laying a new data base for exploration and research of earth science.

Divergence and curl features of the omnidirectional vector geophone are features of a wave detector with a rigid support structure that is placed on free surface of the earth's surface. When the wave detector is placed underground or inside a medium, these features are determined by a placement environment, material of the support structure of the wave detector and its contact relationship with the external world. These features can be designed depending on change of the specific application purpose. This will not be described in detail in the invention.

Application of the omnidirectional vector geophone in seismic wave detection is a completely new idea of seismic wave detection method, which can develop a completely new idea of multi-dimensional, processing and interpretation method, and form a completely new series of seismic exploration technologies, not just a new technology of improving signal-to-noise ratio, sensitivity and fidelity. Further research and application of the technology will discover more technical characteristics, and belongs to a completely new technical field of invention, discovery and development.

The purpose, technical solution and beneficial effect of the invention have been further described in detail in the above specific embodiments, it should be understood that the above contents are merely specific embodiments of the invention and are not for limiting protection scope of the invention, and any modifications, equivalent replacements, improvements etc. within the spirit and principle of the present invention shall be included within the protection scope of the present invention.

The invention claimed is:

1. An omnidirectional vector geophone, comprising: eight wave detectors and support structures thereof, the support structures are used for supporting the eight wave detectors such that bottom surfaces of each two wave detectors are on one of regular triangle surfaces of a regular tetrahedron, crossing points of working shafts of the two wave detectors that are on the same regular triangle surface that cross with the regular triangle surface are both on an angular bisector of an angle of the regular triangle surface and are symmetric with respect to the center of the regular triangle surface;

wherein, letting that one of regular triangle surfaces of the regular tetrahedron is a main triangle surface; one of the angles of the main triangle surface is a first vertex angle of the regular tetrahedron, crossing points of working shafts of two wave detectors that are on the main triangle surface that cross with the main triangle surface are both on an angular bisector of the first vertex angle;

letting that the other surface of the regular tetrahedron where a bottom edge opposite to the first vertex angle is a first side surface of the regular tetrahedron, a midpoint of the bottom edge slides along an anticlockwise direction on the main triangle surface to meet an angle on the first side surface that is defined as a second vertex angle; crossing points of working shafts of two wave detectors on the first side surface that cross with the first side surface are both on an angular bisector of the second vertex angle;

letting that the other surface of the regular tetrahedron where a bottom edge opposite to the second vertex angle is a second side surface of the regular tetrahedron, a midpoint of the bottom edge slides along a clockwise direction on the first side surface to meet an angle on the second side surface that is defined as a third vertex angle; crossing points of working shafts of two wave detectors on the second side surface that cross with the second side surface are both on an angular bisector of the third vertex angle;

letting that the other surface of the regular tetrahedron where a bottom edge opposite to the third vertex angle is a third side surface of the regular tetrahedron, a midpoint of the bottom edge slides along an anticlockwise direction on the second side surface to meet an angle on the third side surface that is defined as a fourth vertex angle; crossing points of working shafts of two wave detectors on the third side surface that cross with the third side surface are both on an angular bisector of the fourth vertex angle;

or, letting that the first vertex angle, the second vertex angle, the third vertex angle and the fourth vertex angle correspond to a first vertex, a second vertex, a third vertex and a fourth vertex of the regular tetrahedron respectively;

crossing points of working shafts of two wave detectors that are on the main triangle surface that cross with the main triangle surface are both on an angular bisector of the first vertex angle;

crossing points of working shafts of two wave detectors on the first side surface that cross with the first side surface are both on an angular bisector of an angle of the third vertex that is on the first side surface;

crossing points of working shafts of two wave detectors on the second side surface that cross with the second side surface are both on an angular bisector of an angle of the fourth vertex that is on the second side surface; and crossing points of working shafts of two wave detectors on the third side surface that cross with the third side surface are both on an angular bisector of an angle of the second vertex that is on the third side surface.

2. The omnidirectional vector geophone according to claim 1, wherein, the wave detector is a cylindrical electromagnetic type wave detector, a distance from a bottom surface of each cylindrical electromagnetic type wave detector to the tetrahedron geometric center of the regular tetrahedron is a minimum value by which the wave detectors do not contact with each other.

3. The omnidirectional vector geophone according to claim 1, wherein, the wave detector is a flat sheet capacitor type wave detector.

4. The omnidirectional vector geophone according to claim 1, wherein, eight space vectors of the eight wave detectors conform to a stokes' integral formula.

5. The omnidirectional vector geophone according to claim 1, wherein, amplitude response of the wave detector and an angle $\theta$ between a working shaft of the wave detector and a wave field normal are in such a relationship: out(t) =A(t)cos $\theta$, wherein A(t) is response of the wave detector to the wave field when $\theta$=0.

6. The omnidirectional vector geophone according to claim 1, wherein, a conical tail cone is connected on the support structure, an extension line of an axis of the conical tail cone passes through one vertex of the regular tetrahedron and vertically penetrates through the center of one of the surfaces of the regular tetrahedron.

7. The omnidirectional vector geophone according to claim 6, wherein, the omnidirectional vector geophone further comprises: a spherical shell which is divided into an upper-half spherical shell and a lower-half spherical shell, eight wave detectors and the support structure are placed inside the spherical shell, the lower-half spherical shell is provided with a tail cone hole at the bottom, and the above tail cone passes through the tail cone hole of the lower-half spherical shell.

8. The omnidirectional vector geophone according to claim 7, wherein, the upper-half spherical shell and the lower-half spherical shell are respectively provided on edges thereof with projections that are matched with each other, the projections of the upper-half spherical shell and the lower-half spherical shell are fixed by a fixing assembly.

9. The omnidirectional vector geophone according to claim 7, wherein, a signal line hole is provided on the spherical shell, signal output lines of the wave detectors pass through the signal line hole.

10. The omnidirectional vector geophone according to claim 9, wherein, waterproof may be sealed by a silicone or rubber material at the joint gap between the upper-half spherical shell and the lower-half spherical shell of the spherical shell, the tail cone hole and the signal line hole.

11. The omnidirectional vector geophone according to claim 1, wherein, the support structure is a regular tetrahedron support structure, each surface of the regular tetrahedron support structure is any curved surface or a plane.

* * * * *